(12) United States Patent
Lansberry (10) Patent No.: US 6,408,963 B1
(45) Date of Patent: Jun. 25, 2002

(54) VEHICLE WITH COUNTERBALANCE STRUCTURE FOR OFFSETTING LONGITUDINALLY OFF-CENTER LOADS

(75) Inventor: John B. Lansberry, Woodland, PA (US)

(73) Assignee: Lansberry Tractor Company, Inc., Woodland, PA (US)

(*) Notice: Subject to any disclaimer, the term of this patent is extended or adjusted under 35 U.S.C. 154(b) by 0 days.

(21) Appl. No.: 09/669,887

(22) Filed: Sep. 27, 2000

Related U.S. Application Data
(60) Provisional application No. 60/156,451, filed on Sep. 28, 1999.

(51) Int. Cl.[7] ............................................. B62D 55/02
(52) U.S. Cl. ..................... 180/9.34; 180/9.36; 180/209
(58) Field of Search .............................. 180/24.02, 209, 180/9.34, 9.36; 212/196, 197, 198; 280/758, 759

(56) References Cited

U.S. PATENT DOCUMENTS

| | | | |
|---|---|---|---|
| 3,908,849 A | * 9/1975 | Carroll | 214/672 |
| 4,679,803 A | * 7/1987 | Biller et al. | 280/6 H |
| 5,191,952 A | * 3/1993 | Satzler et al. | 180/9.52 |
| 5,322,328 A | * 6/1994 | Van Mill et al. | 280/789 |
| 5,346,233 A | * 9/1994 | Moser | 280/149.2 |
| 5,615,748 A | * 4/1997 | Lansberry | 180/9.36 |
| 5,685,563 A | * 11/1997 | Ottestad | 280/758 |
| 6,065,556 A | * 5/2000 | Andrews | 180/209 |

FOREIGN PATENT DOCUMENTS

| | | | | |
|---|---|---|---|---|
| GB | 2160167 | * 12/1985 | | 280/759 |
| JP | 4356289 | * 12/1992 | | 280/758 |

* cited by examiner

Primary Examiner—Lanna Mai
Assistant Examiner—Hau Phan
(74) Attorney, Agent, or Firm—Pillsbury Winthrop LLP (57) ABSTRACT

The present invention relates to a vehicle that has a frame, a driving track assembly, and a pair of secondary driving assemblies mounted on opposing lateral sides of the track assembly. More specifically, the present invention relates to a vehicle that has one or more counterbalance structures for offsetting longitudinally off-center loads carried on the frame of such a vehicle.

7 Claims, 4 Drawing Sheets

VEHICLE WITH COUNTERBALANCE STRUCTURE FOR OFFSETTING LONGITUDINALLY OFF-CENTER LOADS

The present application claims priority to U.S. Provisional appln. of Lansberry, Ser. No. 60/156,451, filed Sep. 28, 1999, the entirety of which is hereby incorporated into the present application by reference.

FIELD OF THE INVENTION

The present invention relates to a vehicle that has a frame, a driving track assembly, and a pair of secondary driving assemblies mounted on opposing lateral sides of the track assembly. More specifically, the present invention relates to a vehicle that has one or more counterbalance structures for offsetting longitudinally off-center loads carried on the frame of such a vehicle.

BACKGROUND OF THE INVENTION

U.S. Pat. No. 5,615,748 (which is the subject of U.S. Reissue application Ser. Nos. 09/598,530 and 09/577,261) discloses a vehicle that comprises a main frame, a track assembly that has an endless ground engaging track for driving the vehicle, and a pair of ground engaging wheels that provide for steering and aid in driving the vehicle along the ground. The vehicle of the '748 patent combines the advantages of vehicles that are track-driven only and vehicles that are wheel-driven only into a single vehicle.

One problem that has been realized with the vehicle of the '748 patent can be best appreciated from the manner in which the flanking wheels and the track assembly are positioned with respect to the vehicle's center of gravity. Because steering in the vehicle of the '748 patent is provided by the wheels, irrespective of whether the steering is performed by pivoting the wheels about vertically extending axes or rotating the wheels at different speeds, it is desirable to locate the wheels on opposing sides of the vehicle's center of gravity. Locating the wheels on opposing sides of the vehicle's center of gravity provides for effective and efficient control of the vehicle during steering operations. More specifically, steering of the vehicle requires less force when the vehicle's center of gravity is located between the wheels than when the vehicle's center of gravity is located at a point distal from the wheels.

Also, because the primary motive force in the vehicle of the '748 patent is provided by the track assembly, it is desirable to locate the track assembly with respect to the vehicle's center of gravity in such a manner to ensure that the vehicle's weight is distributed relatively evenly over the parts of the track that are engaged with the ground. This ensures that the track assembly's tractive forces are fully put to the ground along the entire length of the track portion engaging the ground. This substantially even weight distribution is important when driving on uneven terrain because this terrain may create situations wherein only certain portions of the vehicle's track are engaged with firm ground. By providing the track with even weight distribution, the vehicle is better suited for handling such situations.

When a removable attachment is used with the vehicle of the '748 patent, the longitudinally off-center weight of the attachment changes the vehicle's center of gravity. For example, when a bulldozer or plow attachment is removably attached to the front end of the vehicle frame, the weight of the attachment applies a force to the frame that causes vehicle's center of gravity to shift forwardly towards the attachment. As a result, if the weight of the attachment is heavy enough, the vehicle's center of gravity will no longer be located between the flanking wheels. This results in a loss of steering efficiency and affects the vehicle's overall control. Further, the change in the vehicle's center of gravity will result in the vehicle's weight being distributed unevenly over the portions of the track engaged with the ground. This creates the situation described above and increases the difficulty of handling the vehicle over soft or uneven terrain.

It should be noted that the above-described undesirable situation can be created by the application of any longitudinally off-center load to the frame. For example, if the vehicle were designed for harvesting with a fixed hopper on one end thereof, filling of the hopper with harvested articles would increase the load at that end, thus creating a longitudinally off-center loading situation. As with the removable function attachment, this loading situation will also move the vehicle's center of gravity away from its normal position thereof and towards the hopper.

Consequently, there exists a need for a way to offset the changes in the vehicle's center of gravity created by the application of longitudinally off-center loads to the vehicle.

SUMMARY OF THE INVENTION

It is therefore the object of the present invention to meet the above-described need. To meet this object, the present invention provides a vehicle comprising a main frame having first and second opposing longitudinal end portions and a driving track assembly mounted to the main frame and including an endless ground engaging track that extends generally in a longitudinal direction of the vehicle. The frame is constructed and arranged to carry a longitudinally off-center load thereon that applies a force to the frame tending to shift a center of gravity of the vehicle towards the first longitudinal end portion thereof. This load may be applied by a removable functional attachment which is removably attached to the frame or by one or more objects, such as hay bales or a hopper containing harvested articles, that are carried on the vehicle for transport. The invention is designed to accommodate for any type of longitudinally off-center load.

The vehicle further comprises pair of secondary driving assemblies mounted to the frame on opposing lateral sides of the track assembly in flanking relation. Each of the secondary driving assemblies includes a ground engaging driving structure spaced laterally from the endless track. An engine assembly is constructed and arranged to supply power to the track assembly and the secondary driving assemblies. The driving track assembly is constructed and arranged to move the endless track using power supplied from the engine assembly to affect a vehicle driving operation wherein the endless track engages the ground to drive the vehicle in the longitudinal direction of the vehicle. Each of the secondary driving assemblies is constructed and arranged to operate the ground engaging driving structures using power supplied from the engine assembly so as to impart force to the vehicle. A steering system is operatively connected to the secondary driving assemblies and is constructed and arranged to control operation of the secondary driving assemblies so as to affect a vehicle steering operation wherein the ground engaging driving structures are operated to turn the vehicle with respect to the longitudinal direction.

The vehicle further comprises counterbalance structure movably mounted to the main frame. The counterbalance structure is movable from a normal, inoperative position through a range of operating positions wherein in each of the operating positions the counterbalance structure applies a counterbalancing force to the frame that tends to shift the vehicle's center of gravity towards the second longitudinal end portion of the frame. The vehicle is constructed and arranged such that, in the absence of the aforesaid longitudinally off-center load being carried on the frame and with the counterbalance structure in the normal, inoperative position thereof, the vehicle has a normal center of gravity (a) located with respect to the track assembly in such a manner that a portion of the vehicle's total weight borne by the track assembly is distributed substantially evenly over the parts of the endless track that engage the ground and (b) located laterally between the ground engaging driving structures. The counterbalance structure is constructed and arranged such that the counterbalancing force applied by the counterbalance structure to the frame varies as the counterbalance structure is moved through the range of operating positions so that, when the aforesaid longitudinally off-center load is carried on the frame, the counterbalance structure can be moved to a corresponding one of the operating positions that enables the counterbalancing force applied to the frame by the counterbalance structure to substantially offset the force applied by the load in such a manner that the vehicle's center of gravity remains at or near the normal location thereof.

The advantage of the provision of one or more counterbalance structures is that it allows longitudinally off-center loads of varying magnitudes to be carried by the vehicle of the present invention without significantly sacrificing performance or control. In particular, the counterbalance structure can be repositioned through its range of positions to offset the varying forces applied by different longitudinally off-center loads and maintain the vehicle's center of gravity in its best desirable longitudinal position with the wheels on opposing sides thereof.

A related aspect of the invention provides a method for counterbalancing a longitudinally off-center load in the type of vehicle discussed above. The method comprises applying a longitudinally off-center load on the main frame such that the load applies a force to the frame that tends to shift the vehicle's center of gravity away from the normal location thereof towards the first longitudinal end portion of the frame; and moving the counterbalancing structure to an operating position whereat the counterbalancing force applied to the frame by the counterbalance structure substantially offsets the force applied to the frame by the longitudinally off-center load in such a manner that the vehicle's center of gravity remains at or near the normal location thereof.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
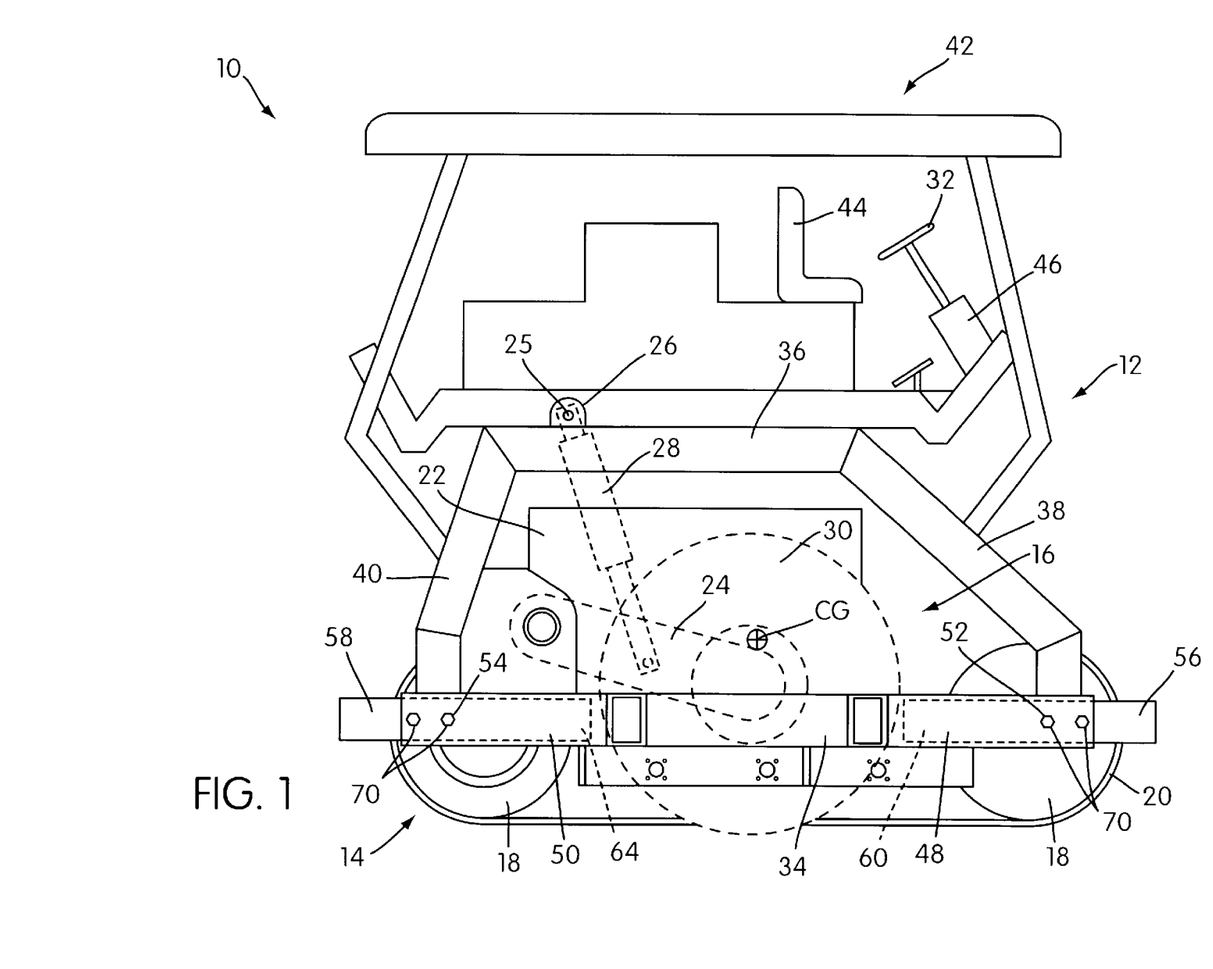
FIG. 1 is an elevated right side view of a vehicle constructed in accordance with the principles of the present invention with the secondary driving assemblies thereof being shown in phantom to more clearly illustrate the releasable locking of the vehicle's forward and rearward counterbalancing structures wherein the counterbalancing structures are moved to their respective normal inoperative positions.

FIG. 1 is a right side elevated view of a vehicle, generally indicated at 10, constructed in accordance with the principles of the present invention. The vehicle 10 is of the same general type disclosed in U.S. Pat. No. 5,615,748, U.S. Patent Application No. 60/215,082, filed Jun. 30, 2000, and U.S. patent application Ser. No. 09/292,673, filed Apr. 16, 1999 (and its continuation U.S. patent application Ser. No. 09/524,533), the entirety of each being incorporated into the present application for all purposes. The vehicle 10 has a main frame, generally indicated at 12, a driving track assembly, generally indicated at 14, mounted to the frame 12, and a pair of secondary driving assemblies, each generally indicated at 16, disposed on opposing lateral sides of the track assembly 14 in flanking relation.

The track assembly 14 comprises a hydraulically powered motor (not shown), a series of cylindrical rollers 18, some of which may be freewheeling and some of which are rotatably driven under power by the hydraulic motor, and an endless ground engaging track 20 that extends longitudinally with respect to the frame 12 and around the rollers 18. During vehicle operation, the hydraulic motor rotates the driven rollers 18 to drive the track 20, which in turn moves the vehicle 10 along the ground in a manner similar to typical tracked vehicles.

The hydraulic motor of the track assembly 14 draws its hydraulic power from an engine assembly 22 mounted to the frame 12 within the track envelope. The engine assembly 22 comprises an internal combustion engine (not shown) and a hydrostatic pump (not shown) that fluidly communicates with and provides pressurized hydraulic fluid to the track assembly's hydraulic motor. The engine assembly 22 may have any construction and it is contemplated to use the arrangement disclosed in any of the above-incorporated patents/applications.

The secondary driving assemblies 16 each comprise a mounting arm 24 that pivotally mounts the assemblies 16 to fixed mounting structures 26 on the vehicle frame 12. This pivotal mounting is accomplished by inserting a bolt 25 extending from the upper end of the arm 24 through an aperture in the mounting structure 26. A pair of hydraulic cylinders 28 are pivotally mounted at an upper end thereof to the frame 12 and at a lower end thereof to an associated mounting arm 24. A ground engaging driving structure in the form of a rotatable wheel 30 is rotatably mounted on the free or lower end of each arm 24. Alternatively, the ground engaging driving structures may be small track assemblies as shown in the above-incorporated '673 and '082 applications. Also, in accordance with the teachings of the above-incorporated '673 and '082 applications, each secondary driving assembly 16 further comprises a hydraulic motor (not shown) that draws power via pressurized fluid from the hydrostatic pump of the engine assembly 22 to rotate its respective wheel 30. The wheels 30 engage the ground during vehicle operation so that rotation thereof imparts force to the vehicle 10 to supplement the main driving power of the track assembly 22. Reference may be made to the above-incorporated '673 and '082 applications for more specifics concerning the hydraulic motor and the computer-based control system therefor.

Steering in the vehicle 10 of the present invention is accomplished by rotating the wheels 30 at different rotational speeds so that the force imparted to the vehicle by one wheel 30 is greater than the force imparted to the vehicle by the other wheel 30. As a result, the vehicle 10 is turned in accordance with the difference in forces imparted by the vehicle wheels 30. Reference may be made to the above-incorporated '673 and '082 applications for more details concerning how this type of steering is effected. Alternatively, steering may be provided by using wheels that pivot about generally vertically extending axes shown as an example in the '748 patent.

The vehicle 10 also comprises a steering system, a steering wheel of which is shown at 32. The steering system functions to control the amount of pressurized fluid flowing to the hydraulic motors that drive the wheels 30 based on user input pivoted by turning of the steering wheel 32. By controlling the amount of pressurized fluid flowing to the hydraulic motors, the steering system controls the amount of force imparted to the vehicle 10 by each wheel 30 and hence controls the vehicle's steering or turning movements. The details of the steering system are fully disclosed in the above-incorporated '673 and '082 applications and will not be detailed herein.

The hydraulic cylinders 28 of the secondary driving assemblies 16 are provided to vertically move the wheels 30 and control the amount of pressure applied by each wheel 30 to the ground using pressurized fluid supplied from the engine assembly's hydrostatic pump. By vertically moving the wheels 30, it can be ensured that all the vehicle's tractive forces are put to the ground even when driving over uneven terrain. The arrangement shown herein is preferred because each wheel 30 can move vertically with the bottom surface thereof remaining generally parallel to the ground.

The vehicle frame 12 comprises a plurality of tubular metal frame rails that are joined together by welding or the like. These members include a pair of lower frame rails 34 that extend generally longitudinally and parallel to one another, a pair of upper frame rails 36 that extend generally longitudinally and parallel to one another, a pair of forward frame rails 38 that extend generally vertically between the forward ends of the upper and lower frame rails 34, 36, and a pair of rearward frame rails 40 that extend generally vertically between the rear ends of the upper and lower frame rails 34, 36. The frame 12 also includes upper laterally extending frame rails (not shown) that interconnect the upper rails 36 together in the lateral direction of the vehicle 10 and lower laterally extending frame rails (not shown) that interconnect the lower rails 34 together in the lateral direction of the vehicle 10. These lower lateral frame rails also provide mounting points and support for the vehicle engine assembly 22 and its associated componentry.

A vehicle cockpit assembly 42 is mounted on top of the vehicle frame 12. The cockpit assembly 42 includes a seat 44 for the driver, the aforementioned steering wheel 32, a dashboard 46 that provides various controls and conventional gauges, and devices for controlling vehicle speed (such as a pedal brake for braking and a hand throttle or gas pedal for controlling vehicle speed). The construction of the cockpit assembly 42 is not particularly important to practicing the present invention and thus will not be described in further detail.

Each of the lower frame rails 34 has a pair of tubular sleeves 48, 50, located on its outboard face. These sleeves 48, 50 are formed by welding or otherwise fixing C-shaped, elongated metal members to the lower frame rails 34 whereby the C-shaped members and the outboard frame rail wall cooperate to define the sleeves 48, 50. In each lower frame rail 34, one of these sleeves 48 is located at the forward end of the frame rail 34 and the other of these sleeves 50 is located at the rear end of the frame rail 34. Each of these sleeves 48, 50 has a series of generally circular apertures 52, 54, formed through the outboard wall thereof. The apertures 52, 54 are evenly spaced apart from one another in the longitudinal direction of their respective sleeves 48, 50 and in the generally longitudinal direction of the vehicle.

The vehicle 10 also comprises a forward counterbalance structure 56 and a rearward counterbalance structure 58. Each of these counterbalance structures 56, 58 is an elongated metal tubular member that is bent into a generally U-shaped configuration. The free ends 60 of the forward counterbalance structure 56 are each sized to fit in a telescoping relationship within the forward sleeves 48 with the bight portion thereof extending generally in the lateral direction of the vehicle 10. The free ends 64 of the rearward counterbalance structure 58 are each sized to fit in a telescoping relationship within the rearward sleeves 50 with the bight portion thereof extending generally in the lateral direction of the vehicle 10. The outboard wall of the free ends 60, 64 of each of the counterbalance structures 56, 58 each have a series of apertures 57, 59 formed therethrough.

Figure 2:
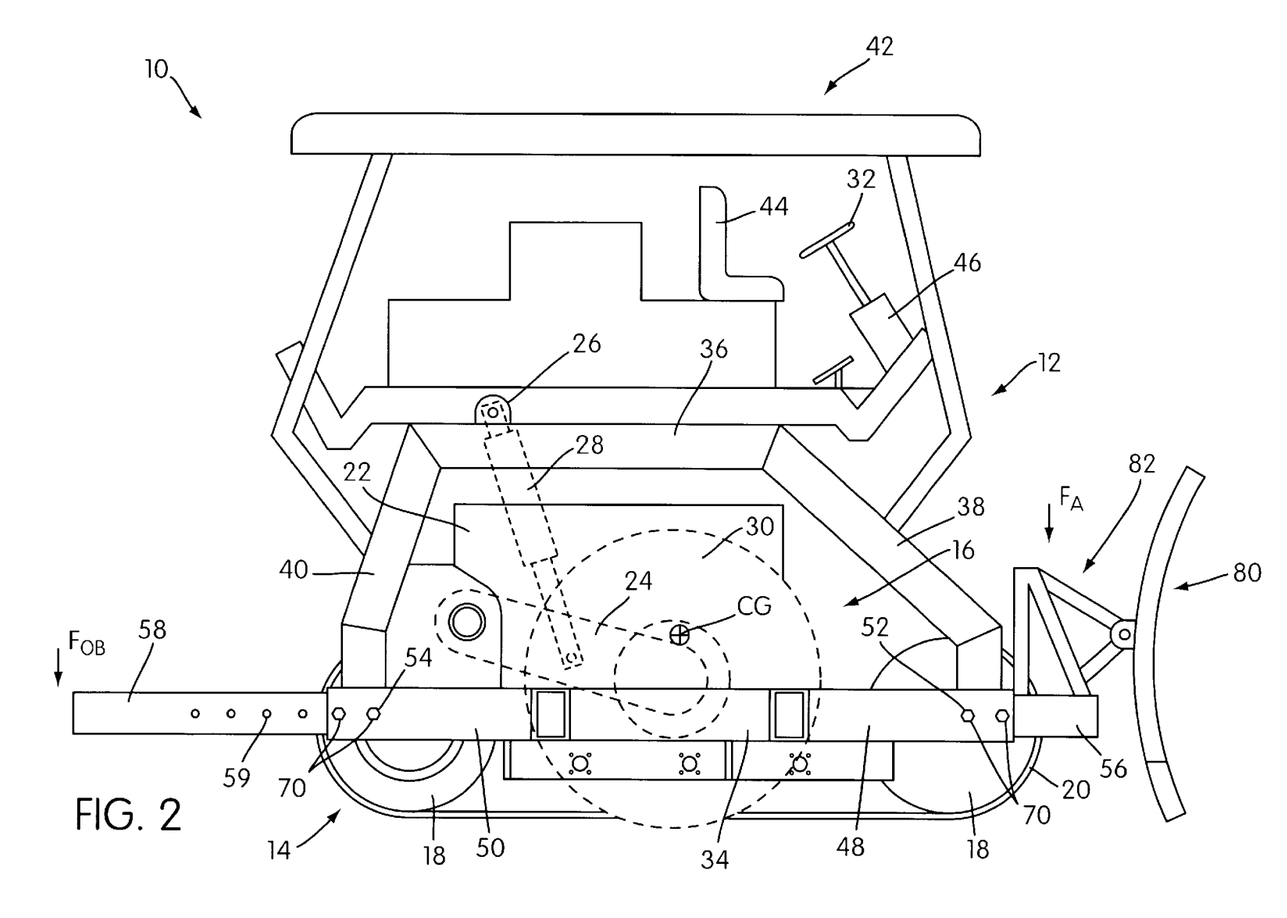
FIG. 2 is a view similar to FIG. 1 with a removable functional attachment removably mounted to a forward end portion of the vehicle frame and the frame's rearward counterbalancing structure moved to a position wherein its weight counterbalances the weight of the removable attachment, the removable attachment illustrated being a bulldozer plow attachment.

As best seen in FIG. 2, a series of releasable locks in the form of generally cylindrical threaded bolts 70 is provided. These bolts 70 are sized to be received within the apertures on both the sleeves 48, 50 and the free ends of the counterbalance structures 56, 58. In particular, each bolt 70 is sized so that either of the counterbalance structures 48, 50 can be moved in the vehicle's longitudinal direction until the apertures on the counterbalance structure align with selected apertures on the corresponding sleeves 48, 50 and then the bolts 70 can be inserted into the aligned apertures to releasably lock the counterbalance structure against further movement. The series of apertures 52, 54 on each set of sleeves 48, 50 provide a range of operating positions through which an associated counterbalance structure 48, 50 can be moved with the bolt 70 serving to releasably lock the associated counterbalance structure in any desired one of the range of operating positions.

The apertures on the counterbalance structure free ends 60, 64 may be provided by internally threaded inserts that fixedly mount within the interior of the counterbalance structure force ends 60, 64. The internal threading provided by these inserts cooperates with the threads on the bolts to retain the same against unintended withdrawal, as may possibly occur due to vibrations of the vehicle during operation. Alternatively, corresponding apertures can be formed through the lower frame rail 34 and the bolts 70 can be inserted entirely through the sleeves, counterbalance structures, and frame rail 34 and be releasably locked by a nut or cotter pin.

Normally, there are no removable functional attachments mounted to the vehicle frame 12 and the counterbalance structures 48, 50 are in their fully retracted, inoperative positions (as shown in FIG. 2). In this condition, the wheels 30 are disposed on opposing sides of the vehicle's center of gravity CG. The position of the vehicle's center of gravity would also remain the same if the counterbalance structures 48, 50 are extended to the same extent so that their weights offset one another while no functional attachments are attached to the frame 12. As discussed above, this provides the vehicle 10 with optimum steering efficiency and effectiveness. Also, in this normal condition, the track assembly 14 is arranged within the vehicle 10 with respect to the vehicle's center of gravity CG such that the portion of the vehicle's total weight normally borne by the track assembly 14 is distributed substantially evenly over the parts of the track that engage the ground (assuming the vehicle is on a flat, level surface). This ensures that the track assembly's tractive forces are put to the ground over as much area as possible for effective traction over uneven or soft terrain. In the absence of any removable attachments (or any other longitudinally off-center loads) being carried the vehicle frame 12, the vehicle's center of gravity CG will remain at its normal location generally between the wheels 30 so long as the counterbalance structures 48, 50 are extended to generally the same amount from their inoperative positions as a result of their weights offsetting one another.

When the forward counterbalance structure 56 is moved forwardly into a selected one of its operating positions, its weight applies a force $F_{cb}$ to the vehicle frame 12 that tends to shift the vehicle's center of gravity CG towards the forward end portion of the track assembly 14. Likewise, when the rearward counterbalance structure 58 is moved rearwardly into a selected one of its operating positions, its weight applies a force $F_{cb}$ to the vehicle frame 12 that tends to shift the vehicle's center of gravity CG towards the rearward end portion of the track assembly 14. With either of these counterbalance structures 48, 50, the force $F_{cb}$ it applies to the vehicle frame 12 increases the further away from its normal position it is moved in its range of operating positions (i.e., in a first direction). Likewise, the force $F_{cb}$ either counterbalance structure 48, 50 applies to the vehicle frame 12 decreases the closer towards its normal position it is moved in its range of operating positions (i.e., in a second direction opposite the first direction).

FIG. 2 shows the vehicle 10 with a removable functional attachment in the form of a bulldozer plow 80 removably mounted on the front end portion of the vehicle frame 12. The removable mounting may be by a three-point hitch 82 or any other suitable attachment arrangement. The weight of the plow 80 constitutes a longitudinally off-center load that applies a downwardly directed force $F_a$ to the vehicle frame 12, which in turn tends to shift the vehicle's center of gravity from its normal location between the wheels 30 towards the front end portion of the track assembly 14. To offset or counterbalance force $F_a$ applied by the weight of the plow 80, the rearward counterbalance structure 58 is moved in an extending manner out of its normal position to a selected or corresponding one of its range of operating positions and releaseably locked thereat. The selected or corresponding operating position is chosen so that the force $F_{cb}$ applied by the weight of the rearward counterbalance structure 58 substantially offsets the force applied by the weight of the plow 80. As a result, the vehicle's center of gravity CG remains at or near its normal location with the wheels 30 on opposing sides thereof. Thus, the force $F_{cb}$ applied by the weight of the rearward counterbalance structure may be considered a counterbalancing force.

Figure 3:
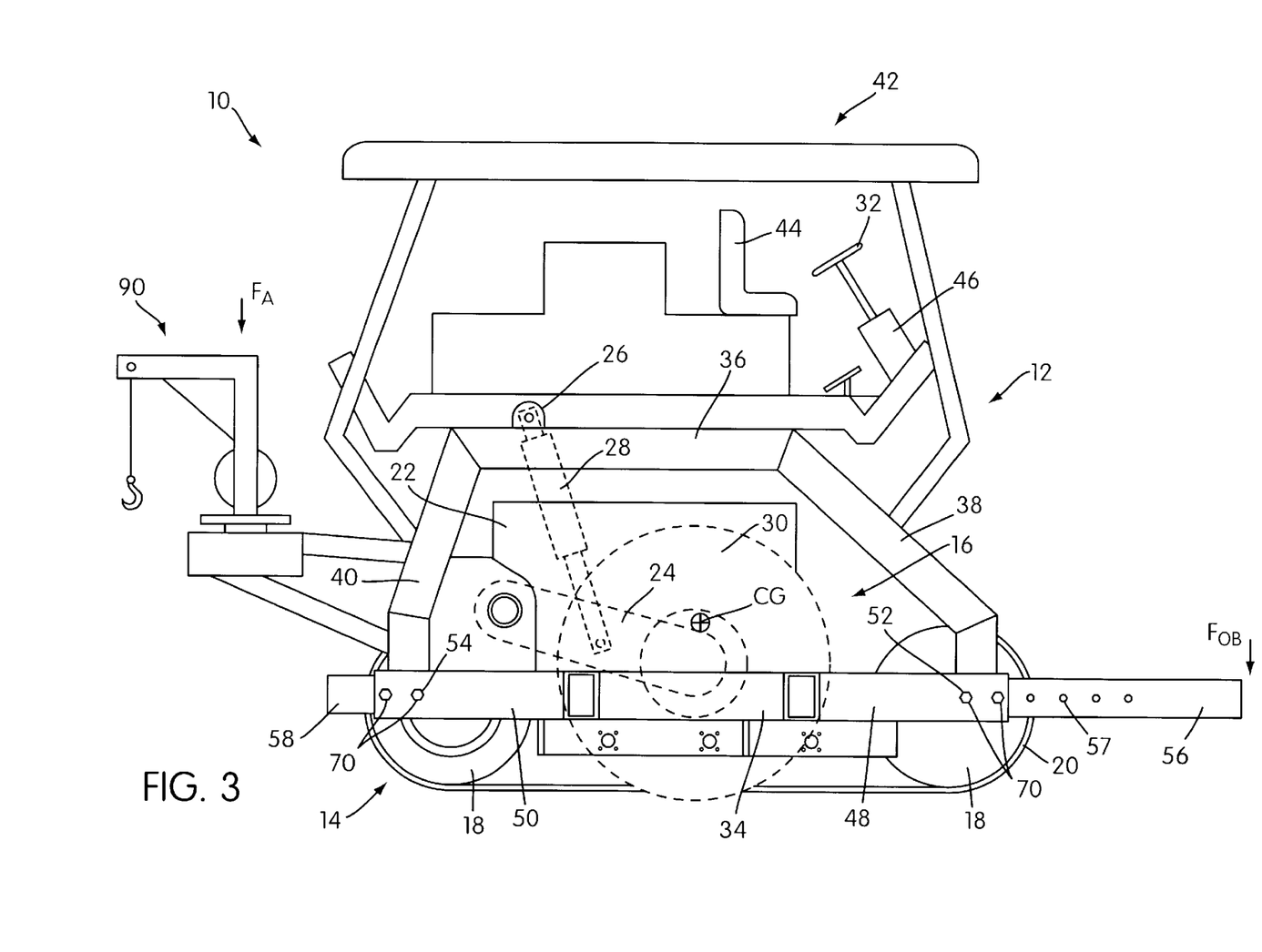
FIG. 3 is a view similar to FIG. 1 with a removable functional attachment removably mounted to a rearward end portion of the vehicle frame and the vehicle's front counterbalance structure moved to a position wherein its weight counterbalances the weight of the removable attachment, the removable attachment illustrated being a power-operated crane and winch system.

FIG. 3 shows the vehicle 10 with a removable functional attachment in the form of a mechanized crane and winch assembly 90 removably mounted on the rear end portion of the vehicle frame 12. Similar to the plow 80, the weight of the crane 90 constitutes a longitudinally off-center load that applies a downwardly directed force $F_a$ to the vehicle frame 12, which in turn tends to shift the vehicle's center of gravity CG rearwardly out of its normal location between the wheels 30 towards the rearward end portion of its track assembly 14. To offset the weight of the crane assembly 90, the forward counterbalance structure 56 is moved in an extending manner to a selected or corresponding one of its operating positions and releasably locked thereat. The operating position of the forward counterbalance structure 56 is selected to correspond to the force $F_a$ applied to the frame 12 by the crane 90 whereby the force $F_a$ of the forward counterbalance structure 56 substantially offsets or counterbalances the crane assembly's 90 force to keep the vehicle's center of gravity CG at or near its normal location between the wheels 30.

The vehicle 10 of the present invention may be constructed with one or two counterbalance structures. In a single counterbalance structure arrangement, the vehicle 10 would be adapted to receive the attachment at one of the vehicle ends (a first end) and the counterbalance structure would be provided at the opposite end (a second end). Also, it is contemplated that in the event exceptionally heavy removable functional attachments are to be used with the vehicle 10, the additional weights may be secured to the distal end of the appropriate counterbalance structure to ensure that it applies a counterbalancing force sufficient to offset the weight of the heavy attachment.

The advantage of the provision of one or more counterbalance structures is that it allows the vehicle 10 to be handle longitudinally off-center loads without a significant sacrifice in performance or control. In particular, the counterbalance structure can be repositioned through its range of positions to offset varying longitudinally off-center and maintain the vehicle's center of gravity in its best desirable longitudinal position with the wheels 30 on opposing sides thereof. Such longitudinally off-center loads may include, but are not limited to, functional attachments (such as harvesting mechanisms, tillers, feller heads, trailers, front end loaders, a log skidder, etc.), or removable articles that are transported by the vehicle (such as hay bales, harvested crop articles in a hopper fixed on the frame, farming equipment, etc.).

Figure 4:
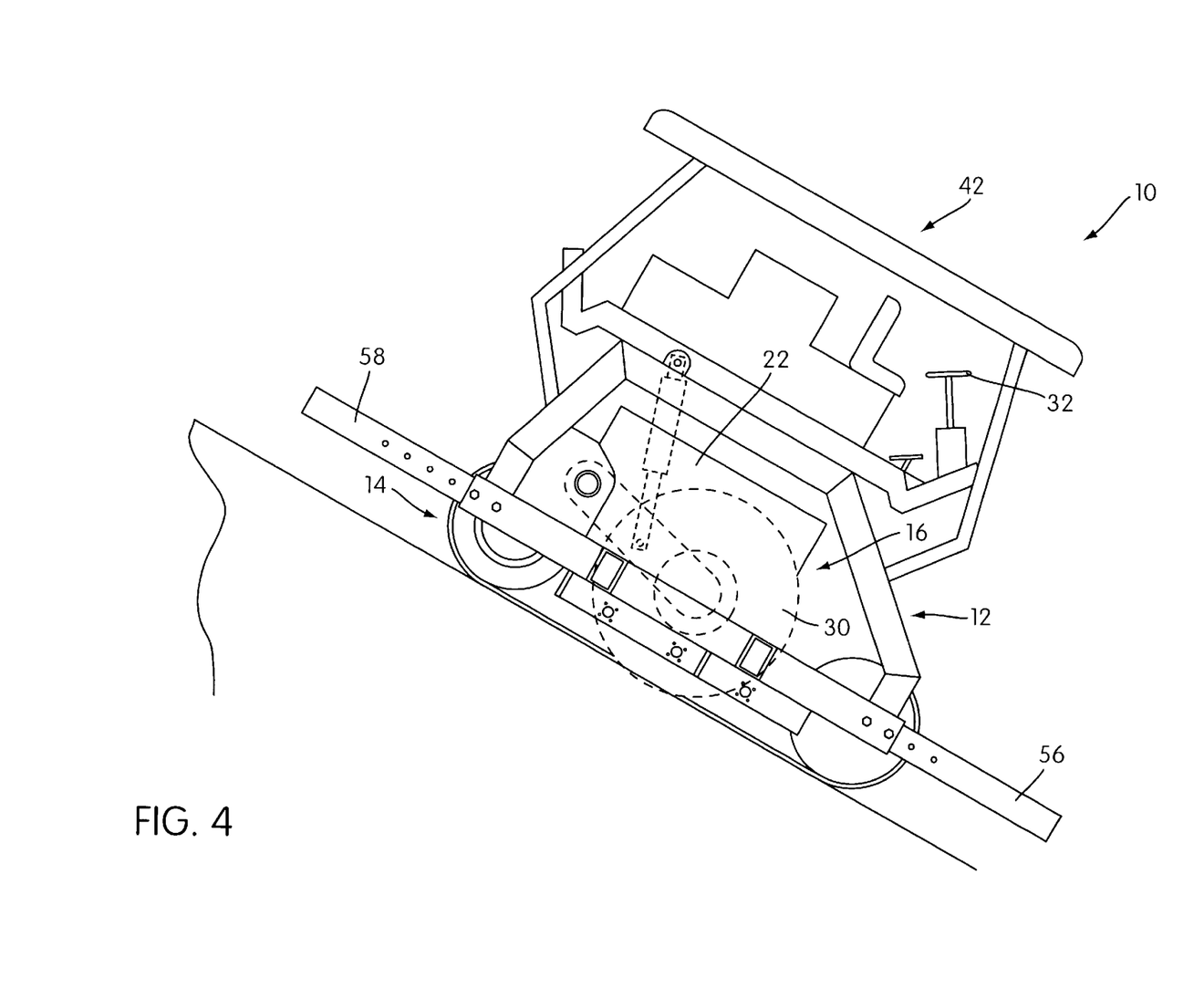
FIG. 4 is an elevated side view of the vehicle of FIG. 1 driving down a steep slope with its front and rear counterbalance structures fully extended to inhibit end-over-end tipping of the vehicle.

Another feature provided by the counterbalance structures disclosed can be appreciated from FIG. 4, which shows the vehicle 10 being driven forwardly down a steep slope. When the slope is steep enough, the vehicle 10 may have a tendency to begin tipping in an end-over-end manner. That is, the vehicle's center of gravity may end up being positioned so that the vehicle 10 is caused to tip forwardly (assuming it is being driven front end down) about the track assembly's front end with the track assembly rear end portion raising out of contact with the ground surface.

The counterbalance structures 56, 58 can be used to prevent this situation. One way is to extend the rear counterbalance structure 58 to its fully extended position so that its weight offsets the vehicle's tendency to tip forwardly. Additionally, the forward counterbalance structure 56 can be extended forwardly to its fully extended position so that it contacts the ground early in the beginning of the tipping motion. As a result, this contact of the forward counterbalance structure 56 will inhibit further tipping movement and maintain at least the front end portion of the track assembly 14 in ground contact so that the vehicle can be safely driven off the slope. Preferably, both counterbalance structures 56, 58 will be fully extended to maintain the vehicle's center of gravity CG between the wheels 30.

As an alternative to manually moving and releasably locking the counterbalance structures 48, 50, a plurality of extendible and retractable hydraulic cylinders (not shown) may be used to extend and retract the counterbalance structures 48, 50 remotely from the cockpit assembly. This alternative arrangement would comprise either one or two hydraulic cylinders connected between each counterbalance structure 48, 50 and fixed points on the frame 12. These hydraulic cylinders each have a sealed cylinder with a piston mounted for reciprocating sliding movement therein. Each piston has a rod extending from the cylinder and connected to its associated counterbalance structure 48, 50. Each cylinder is filled with fluid on opposing sides of the piston and has a pair of ports on opposing sides of the piston that are fluidly communicated to one of the hydrostatic pumps that comprises a part the engine assembly 22. Electronically actuated valves are disposed between each of the ports and the pump. These valves are actuated by controls, such as a switch or a knob linked to a rotary potentiometer, located in the cockpit assembly 42.

With this arrangement, the operator can operate the controls in the vehicle cockpit assembly 42 so as to operate the valves of the cylinder(s) associated with one of the counterbalance structures 48, 50 in such a manner that more fluid is allowed to flow to one side of the piston(s) than the other. This will cause the piston(s) to extend and move the associated counterbalance structure 48, 50 in an extending manner. Likewise, the controls in the cockpit assembly 42 can be operated in a reverse manner to operate the valves of the cylinder(s) associated with the same counterbalance structure so that more fluid is allowed to flow to the opposite side of the piston(s). This will cause the piston(s) to retract and move the counterbalance structure in a retracting manner.

It can thus be appreciated that the objectives of the present invention have been fully and effectively accomplished. It is to be understood, however, that the foregoing preferred embodiment has been provided solely to illustrate the structural and functional principles of the present invention and is not intended to be limiting. To the contrary, the present invention is intended to encompass all the modifications, alterations, and substitutions within the spirit and scope of the appended claims.

Any patents or patent applications mentioned hereinabove and not incorporated by reference are hereby incorporated into the present application by reference.

What is claimed:

1. A vehicle comprising:
   a main frame having first and second opposing longitudinal end portions,
   a driving track assembly mounted to said main frame and including an endless ground engaging track that extends generally in a longitudinal direction of said vehicle;
   a pair of secondary driving assemblies mounted to said frame on opposing lateral sides of said track assembly in flanking relation, each of said secondary driving assemblies including a ground engaging driving structure spaced laterally from said endless track;
   an engine assembly constructed and arranged to supply power to said track assembly and said secondary driving assemblies;
   said driving track assembly being constructed and arranged to move said endless track using power supplied from said engine assembly to affect a vehicle driving operation wherein said endless track engages the ground to drive said vehicle in the longitudinal direction of the vehicle;
   each of said secondary driving assemblies being constructed and arranged to operate said ground engaging driving structures using power supplied from said engine assembly so as to impart force to said vehicle;
   a steering system operatively connected to said secondary driving assemblies and being constructed and arranged to control operation of said secondary driving assemblies so as to affect a vehicle steering operation wherein said ground engaging driving structures are operated to turn said vehicle with respect to said longitudinal direction;
   a first counterbalance structure at the first end portion of said main frame selectively fixedly mounted to said main frame for longitudinal movement from a first fixed longitudinally inward position through a range of first fixed operating positions spaced longitudinally outwardly thereof in the direction of said first end portion so that in each of said first operating positions said first counterbalance structure applies a counterbalancing force to said main frame that tends to shift said vehicle's center of gravity towards the first longitudinal end portion of said main frame;
   said first counterbalance structure being constructed and arranged to have removably mounted thereon a first removable functional attachment, and
   a second counterbalance structure at said second end portion structure of said main frame selectively fixedly mounted to said main frame for longitudinal movement from a second fixed longitudinally inward position through a range of a second fixed operative position spaced longitudinally outwardly thereof in the direction of said second end portion so that in each of said second operative positions said second counterbalance structure applies a counterbalancing force to said main frame that tends to shift said vehicle's center of gravity towards the second end portion of said main frame,
   said second counterbalance structure being constructed and arranged to have removably mounted thereon a second removable functional attachment.

2. A vehicle as defined in claim 1 wherein said first and second counterbalance structures extend longitudinally outwardly of (1) the first and second longitudinal end portions of said main frame respectively and (2) corresponding end portions of said endless ground engaging track respectively.

3. A vehicle as defined in claim 2 wherein each of said first and second counterbalance structures is of U-shaped configuration including a longitudinally outwardly disposed bight portion having a pair of parallel leg portion extending longitudinally inwardly therefrom.

4. A vehicle as defined in claim 3 wherein said main frame includes longitudinally extending sleeves on opposite lateral sides thereof having first and second end portions for slidably receiving therein free ends of the leg portions of said first and second U-shaped counterbalance structures respectively.

5. A vehicle as defined in claim 4 wherein each of said first and second counterbalance structures has releasable locking structure associated therewith constructed and arranged to releasably lock the associated counterbalance structure in the fixed longitudinally unward position and each of the fixed operative positions thereof respectively.

6. A vehicle as defined in claim 5 wherein each sleeve end portion and associate free end of the leg portions of said first and second U-shaped counterbalance structures have cooperating apertures formed therein, said releasable locking structure comprising first and second pairs of locking members, said first pair of locking members being insertable in selected aligned pairs of apertures in the first end portions of said sleeves and the free ends of the leg portions of said first U-shaped counterbalance structure, said second pair of locking members being insertable in selected aligned pairs of apertures in the second end portions of said sleeves and the free ends of the leg portions of said second U-shaped counterbalance structure.

7. A vehicle as defined in claim 1 wherein each of said first and second counterbalance structures has releasable locking structure associated therewith constructed and arranged to releasably lock the associated counterbalance structure in the fixed longitudinally unward position and each of the fixed operative positions thereof respectively.

* * * * *